United States Patent
Nijim et al.

(10) Patent No.: US 9,563,703 B2
(45) Date of Patent: Feb. 7, 2017

(54) SYSTEM, METHOD AND DEVICE FOR SHARING OF PLAYLISTS OF AUTHORIZED CONTENT WITH OTHER USERS

(75) Inventors: Yousef Wasef Nijim, Roswell, GA (US); Terry Douglas Lee, Lawrenceville, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 55 days.

(21) Appl. No.: 13/045,481

(22) Filed: Mar. 10, 2011

(65) Prior Publication Data

US 2012/0233120 A1   Sep. 13, 2012

(51) Int. Cl.
| | | |
|---|---|---|
| *G06F 17/30* | (2006.01) | |
| *H04N 21/4627* | (2011.01) | |
| *H04N 21/4788* | (2011.01) | |
| *H04N 21/482* | (2011.01) | |

(52) U.S. Cl.
CPC .... *G06F 17/30828* (2013.01); *H04N 21/4627* (2013.01); *H04N 21/4788* (2013.01); *H04N 21/4825* (2013.01)

(58) Field of Classification Search
CPC ............ G06F 17/30828; H04N 21/4627; H04N 21/4825; H04N 21/4788
USPC .......................................................... 707/626
See application file for complete search history.

(56) References Cited

U.S. PATENT DOCUMENTS

| | | | | |
|---|---|---|---|---|
| 8,332,895 B2 * | 12/2012 | Nathan | ................ | G11B 19/025 |
| | | | | 379/88.17 |
| 8,473,993 B2 * | 6/2013 | Athias | ................ | H04N 7/17318 |
| | | | | 725/105 |
| 8,595,340 B2 * | 11/2013 | Kazmi | ................ | G06F 21/10 |
| | | | | 709/217 |
| 8,601,572 B2 * | 12/2013 | King | ................ | G06F 17/30766 |
| | | | | 709/219 |
| 9,047,235 B1 * | 6/2015 | Barraclough | ..... | G06F 17/30772 |
| 2003/0093790 A1 * | 5/2003 | Logan | ................ | G06F 17/30265 |
| | | | | 725/38 |
| 2004/0002938 A1 * | 1/2004 | Deguchi | ................ | G06F 17/30 |
| 2004/0162787 A1 * | 8/2004 | Madison | ................ | G06F 21/10 |
| | | | | 705/64 |
| 2005/0216417 A1 * | 9/2005 | Risan | ................ | G06F 21/10 |
| | | | | 705/52 |

(Continued)

OTHER PUBLICATIONS

McElhearn K., "Share your favorite iTunes playlists", dated Dec. 29, 2010, published online at <http://www.macworld.com/article/1156612/software-graphics/itunes-playlist-share.html>, 3 pages.*

*Primary Examiner* — Phuong Thao Cao
(74) *Attorney, Agent, or Firm* — Merchant & Gould

(57) ABSTRACT

A system, method and device for sharing of playlists of authorized content with other users. A user interface is displayed on a media viewing device for creating a playlist of content. The playlist is generated by a user via the user interface and a name is associated with the playlist of content. The playlist is stored using the name. Parameters for sharing the playlist with contacts of the user are configured. At a viewing device of a contact, notification of a playlist created by a user is received. Privileges of the contact associated with content identified in the playlist are determined. Action is taken, by the contact, regarding content identified in the playlist created by the user based on the determined privileges of the contact.

27 Claims, 4 Drawing Sheets

(56) References Cited

U.S. PATENT DOCUMENTS

| | | | |
|---|---|---|---|
| 2005/0240494 A1* | 10/2005 | Cue | G06Q 10/107 705/26.1 |
| 2005/0278377 A1* | 12/2005 | Mirrashidi | G06Q 10/107 |
| 2006/0143236 A1* | 6/2006 | Wu | G06F 17/30053 |
| 2006/0239131 A1* | 10/2006 | Nathan | G11B 19/025 369/30.06 |
| 2006/0288112 A1* | 12/2006 | Soelberg | H04L 63/0428 709/231 |
| 2007/0073726 A1* | 3/2007 | Klein | G06F 17/30017 |
| 2007/0083556 A1* | 4/2007 | Plastina | G06Q 10/10 |
| 2007/0256021 A1* | 11/2007 | Prager | G11B 27/034 715/744 |
| 2008/0010372 A1* | 1/2008 | Khedouri | G06F 17/30094 709/224 |
| 2008/0059532 A1* | 3/2008 | Kazmi | G06F 21/10 |
| 2008/0147711 A1* | 6/2008 | Spiegelman et al. | 707/102 |
| 2008/0155059 A1* | 6/2008 | Hardin | H04N 7/17336 709/218 |
| 2008/0155613 A1* | 6/2008 | Benya | H04N 7/17318 725/89 |
| 2009/0006542 A1* | 1/2009 | Feldman | G06F 17/30053 709/203 |
| 2010/0241711 A1* | 9/2010 | Ansari | G06Q 30/04 709/205 |
| 2010/0251304 A1* | 9/2010 | Donoghue | H04N 5/44543 725/46 |
| 2011/0125867 A1* | 5/2011 | Denk, Jr. | G06Q 30/02 709/217 |
| 2011/0239253 A1* | 9/2011 | West | H04N 21/23436 725/46 |
| 2011/0314388 A1* | 12/2011 | Wheatley | G11B 27/034 715/751 |
| 2012/0088477 A1* | 4/2012 | Cassidy | G11B 27/102 455/414.1 |
| 2012/0158531 A1* | 6/2012 | Dion | G06Q 10/10 705/26.1 |
| 2012/0210377 A1* | 8/2012 | Wong | H04N 21/274 725/109 |
| 2012/0233120 A1* | 9/2012 | Nijim | G06F 17/30828 707/626 |
| 2012/0271882 A1* | 10/2012 | Sachdeva | H04N 21/26258 709/204 |
| 2012/0284744 A1* | 11/2012 | Kumar | G06F 17/30053 725/34 |

\* cited by examiner

SYSTEM, METHOD AND DEVICE FOR SHARING OF PLAYLISTS OF AUTHORIZED CONTENT WITH OTHER USERS

FIELD OF THE INVENTION

This disclosure relates in general to the sharing of media content, and more particularly to a system, method and device for sharing of playlists of authorized content with other users.

BACKGROUND

Cable, satellite, Digital Subscriber Line (DSL), and wireless are the most common types of broadband services. Cable systems deliver hundreds of channels to homes, while also providing a growing number of people with high-speed Internet access and phone service. For example, broadband Internet is achieved over coaxial cable by using cable modems to convert the network data into a type of digital signal that can be transferred over coaxial cable. Satellite television is television delivered by the means of communications satellite and received by a satellite dish and set-top box. DSL uses existing copper telephone lines and a DSL modem to provide broadband services over a standard phone line. Local phone companies, such as Verizon and AT&T, are laying fiber-optic cable directly to the neighborhood and even into the home and office in order to retain customers with promises of ultra-high-speed Internet connections and enhanced entertainment offerings online. Wireless broadband services are rapidly gaining popularity. Wireless broadband does not require a modem or cables. As a result, wireless broadband can be easily established in areas where it is not feasible to deploy DSL or cable. Speeds of wireless broadband are similar to those of cable and DSL.

Video sharing is the use of web-based software to upload and share video clips. Users can upload videos to a video hosting service on the web. These web services host videos online, allowing them to be accessed and viewed (usually streamed) over the internet. Most video hosting services allow users to choose whether the video is to be shared privately or shared publically with the world. For example, YouTube and iTunes allows users to create playlists and share the playlists with other users.

However, playlists associated with television programs, video-on-demand, and other content that is provided via a conditional access device or from the communication service provider have not been provided. Playlists may be created from a mobile device, tablet computers and personal computers, but set-top boxes or related conditional access devices do not provide for the creating and sharing of playlists. Furthermore, a playlist created on a personal computer does not interface with a program guide. So currently there is no method for sharing playlists between users or customers.

Accordingly, there is a need for a system, method and device for sharing of playlists of authorized content with other users.

SUMMARY OF THE INVENTION

To overcome the limitations described above, and to overcome other limitations that will become apparent upon reading and understanding the present specification; embodiments for a system, method and device for enabling users to share their playlist with others is disclosed.

The above-described problems are solved by enabling the sharing of content playlists. Users share a playlist that they created on the set-top, web portal, PC, or mobile device to be shared with their friends who could be the same service provider customers or other service provider customers.

A method for sharing, by a user, playlists of authorized content with contacts of the user is provided. The method includes displaying a user interface on a media viewing device for creating a playlist of content by a user, generating a playlist of content by a user via the user interface displayed on the media viewing device, associating, by the user, a name for the playlist of content generated by the user, storing the generated playlist using the name associated with the playlist and configuring parameters for sharing the playlist with contacts of the user.

In another embodiment, a method for accessing content in a playlist by a contact associated with the playlist is provided. The method includes receiving, at a viewing device of a contact, notification of a playlist created by a user, determining, by the contact, privileges of the contact associated with content identified in the playlist created by the user, and taking action, by the contact, regarding content identified in the playlist created by the user based on the determined privileges of the contact.

In another embodiment, a computer readable medium including executable instructions which, when executed by a processor, provides for sharing, by a user, playlists of authorized content with contacts of the user. The instructions executed by the processor include displaying a user interface on a media viewing device for creating a playlist of content by a user, generating a playlist of content by a user via the user interface displayed on the media viewing device, associating, by the user, a name for the playlist of content generated by the user, storing the generated playlist using the name associated with the playlist and configuring parameters for sharing the playlist with contacts of the user.

In another embodiment, a computer readable medium including executable instructions which, when executed by a processor, provides for accessing content in a playlist by a contact associated with the playlist. The instructions executed by the processor provide for receiving, at a viewing device of a contact, notification of a playlist created by a user, determining, by the contact, privileges of the contact associated with content identified in the playlist created by the user and taking action, by the contact, regarding content identified in the playlist created by the user based on the determined privileges of the contact.

In another embodiment, a system for sharing playlists of authorized content with contacts of a user creating the playlist is provided. The system includes memory for storing data and a processor, coupled to the memory, wherein the processor is configured for displaying a user interface on a media viewing device for creating a playlist of content by a user, receiving input from the user for generating the playlist of content via the user interface, receiving input associating a name for the playlist of content generated by the user, storing the generated playlist using the name associated with the playlist and configuring parameters for sharing the playlist with contacts of the user.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to the sharing of playlists of authorized content with other users.

Figure 1:
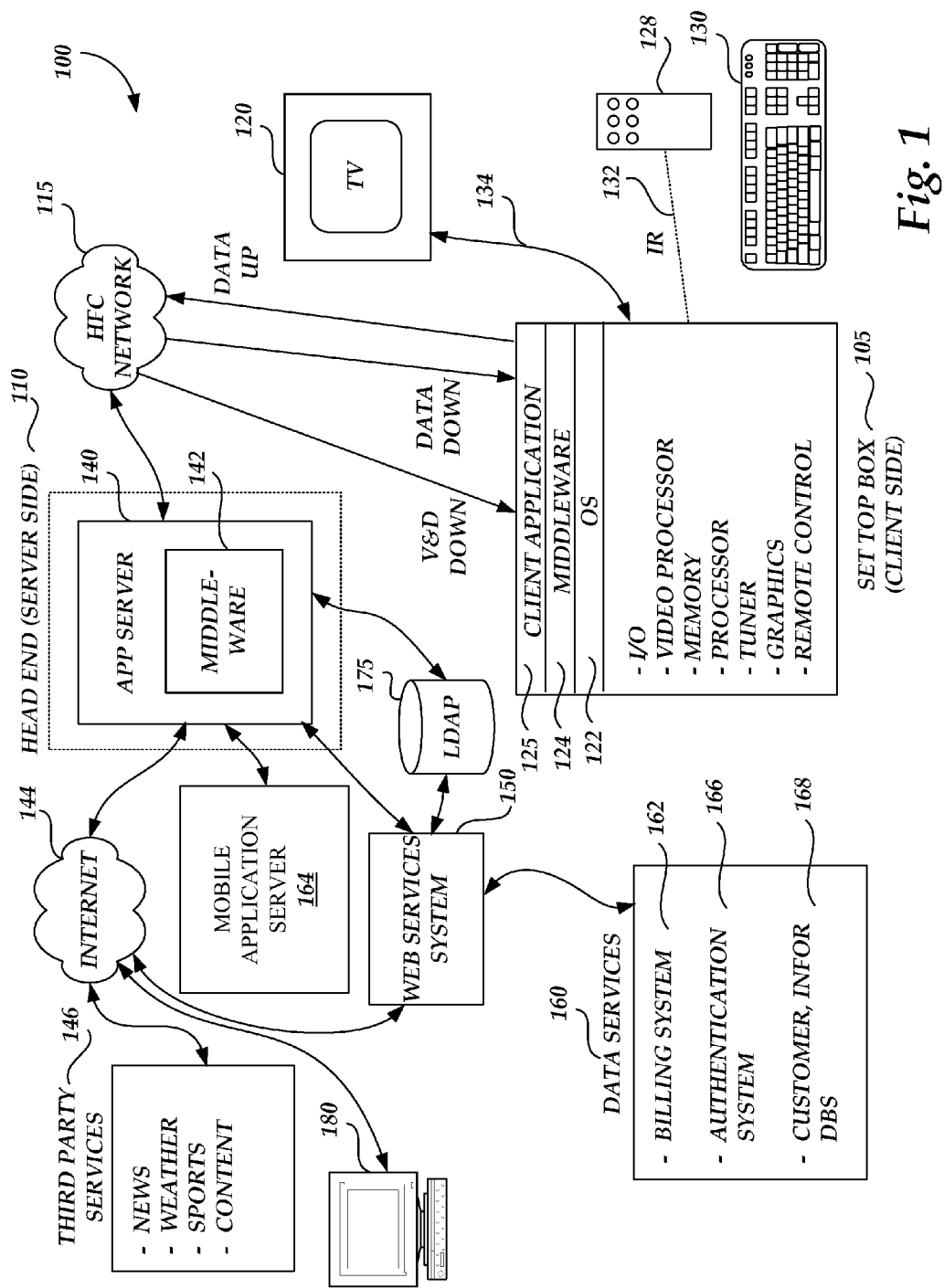
FIG. 1 is a simplified block diagram illustrating a cable television/services system architecture that serves as an exemplary operating environment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments, the functionality of the HFC network 115 allows for efficient bidirectional data flow between the client-side set-top box 105 and the server-side application server 140 of the embodiment.

According to embodiments, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services. According to embodiments, CATV systems 100 provides for the creating and sharing of playlists of subscribers. Such playlists may be stored in storage 175, which may be a Lightweight Directory Access Protocol (LDAP) server. However, those skilled in the art will recognize that embodiments are not meant to be limited to a LDAP server.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment; the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120.

The data downlink and the data uplink, illustrated in FIG. 1, between the HFC network 115 and the set-top box 105 comprise "out of band" data links. According to embodiments, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content. Further, according to embodiments, CATV systems 100 provides for the creating and sharing of playlists of subscribers.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

A cross-platform mobile application server 164 may contain information such as electronic mail addresses, high-speed Internet access subscription information, and electronic mail usage data. An authentication system 166 may include information such as secure user names and passwords utilized by customers 180 for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments, the web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
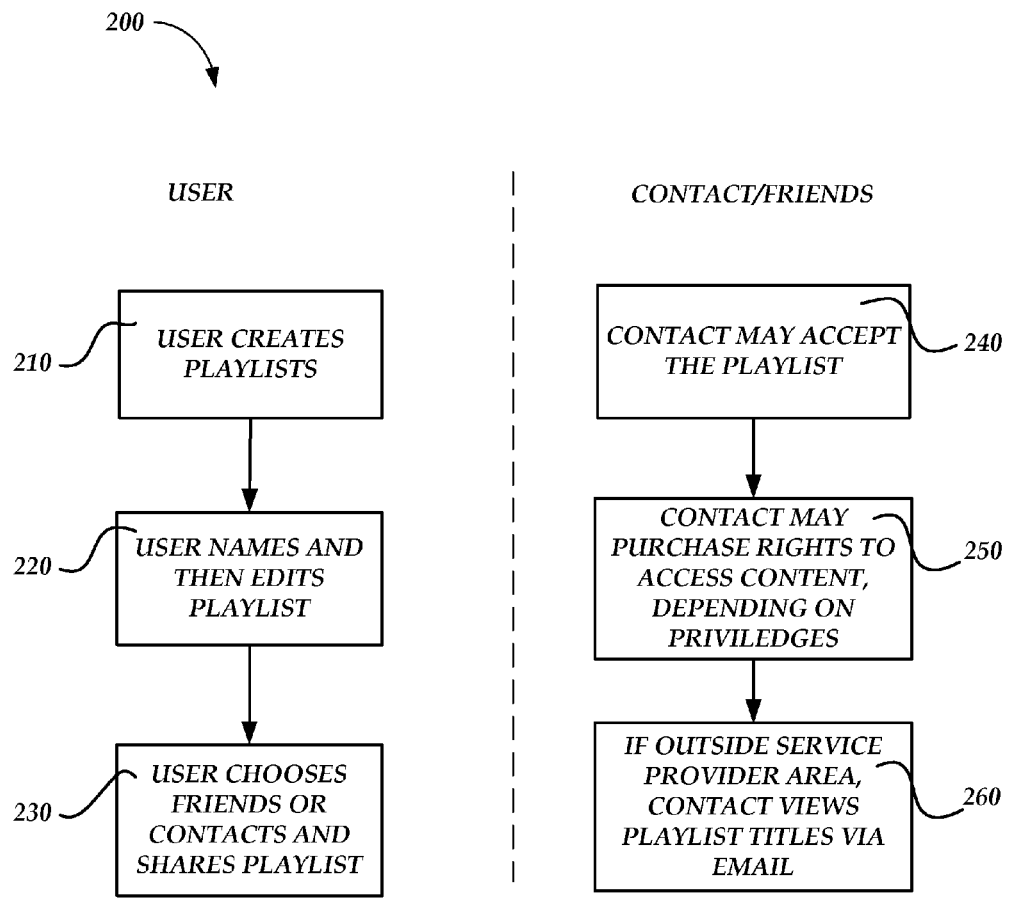
FIG. 2 shows a simplified block diagram process for the sharing of playlists from both a user's perspective and a user's contact's perspective according to one embodiment.

FIG. 2 shows a simplified block diagram process for the sharing of playlists 200 from both a user's perspective and a user's contact's perspective according to one embodiment. Users may create playlists or a favorite/wish list folder 210 for on-demand content including music videos, movies, TV shows, and games. The playlist contains programs that are purchased, subscribed to, or free (the playlist contains programs that the user is entitled to watch). Once a playlist is created 210 from the set top box, web portal, smart device or via the Internet using a PC, a user may name the playlist then add or remove items from the playlist 220. A playlist is stored on the server in the backend infrastructure which enables a user to directly link people to a playlist (see FIG. 3). More specifically, once a playlist has been created, a user may select sharing criteria based on a contact list that includes information such as email addresses and telephone numbers. The user may access the contact information from the set-top box, the web or a mobile device. Then, the user may directly associate their contact(s) to a playlist 230, thereby simplifying the sharing of playlists.

If the contacts have the same access privileges to the content, e.g., they are subscribers to the same content provider or network operator and have the same subscription package, then the contacts will be able to access the content maintained in the playlist. Contacts can acknowledge or accept the playlist 240, which then may be selected for addition to a playlist created by the contact. Alternatively, the playlist may be shown in the contacts' playlist as a separate playlist with the same title that the first user used to create the playlist. The contact may tag such playlist with an identification of the user that created the playlist. In addition, the contact may change the title of the received playlist. Titles within the playlist are displayed the same for the initial user and the contact. Depending upon the conditional access privileges associated with content in the playlist and what privileges the contact has subscribed to, the contact may be able to access the content for free. Optionally, the contact may need to purchase rights to access the content 250. If the contact is not entitled to access any of the content in the playlist, the titles may be presented in a manner that conveys this unavailability. For example, the contact may have to upgrade to a different subscription package to be able to access the content. The interface used to present the playlist to the contact may be configured to display a subscription interface for making arrangements to access the content in the playlist. If the contact is not within the service area of the content provider or network operator, the contact is still able to view the playlist titles 260 so that the contact and the initial user are able to communicate regarding playlists that have been created.

In such a situation, the playlist may be presented as an xml file or in any type of format that is capable of being sent via email to the contacts 260. Thus, the contact may search their viewable content to determine whether the same content that is listed in the playlist is available for separate access. For example, the contact may be a subscriber to a different content provider or network operator. Nevertheless, the contact can search for content provided by their content provider or network operator and access the content when it becomes available, record the content for later access or arrange with the content provider or network operator to have the content provided on demand, e.g., video-on-demand (VOD).

In addition, the playlist may be synchronized among the different platforms, including mobile devices, PC, set top boxes, etc. Within a household, for example, playlists may be shared with other members of the household. This facilitates personalization of the playlist within the home. In this scenario, the other members have the same access privileges because they are in the same household, except for parental/primary user controls that may be implemented.

The playlist interface may be accessible through a program guide or may be provided using a separate program. Thus, a user may use a mobile device to access a portal, which then allows the user to display their playlists on the mobile device.

Figure 3:
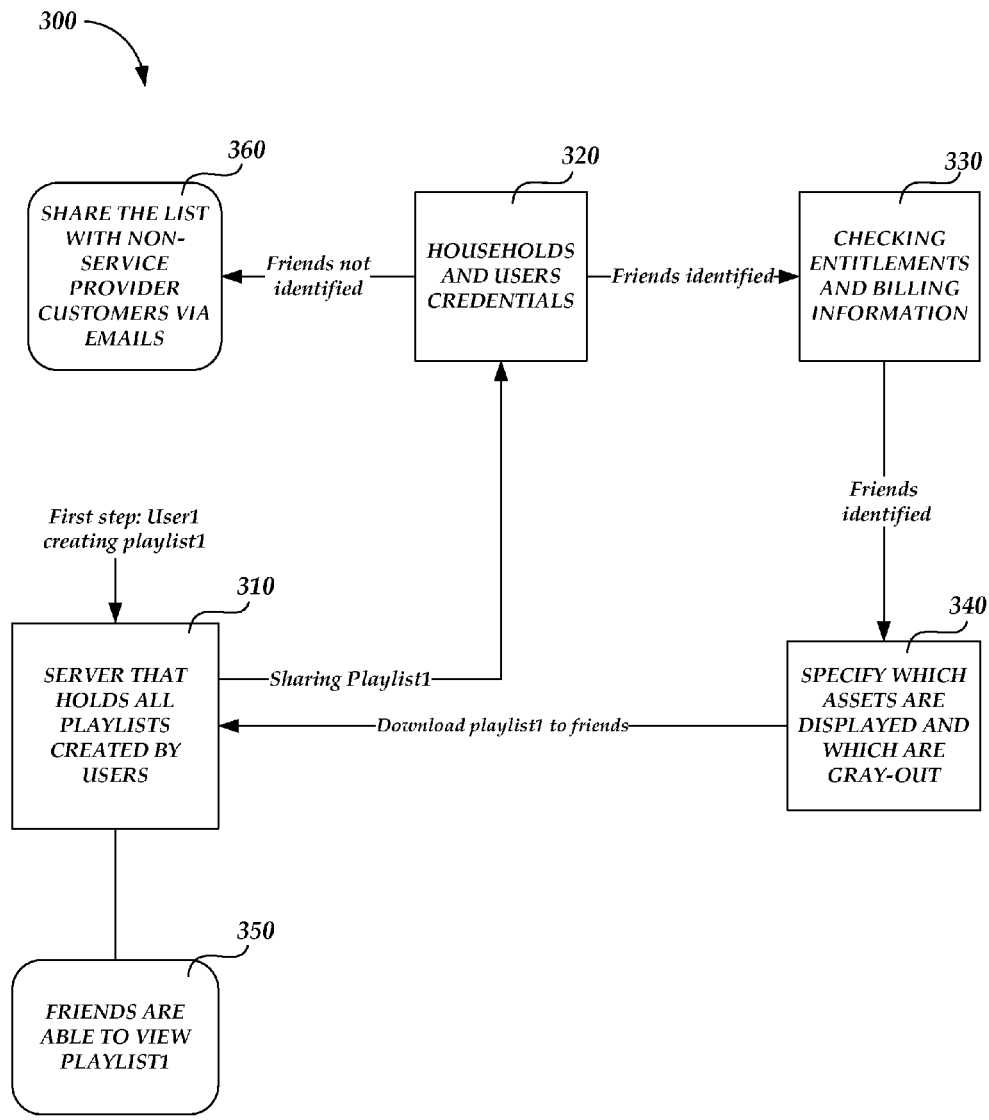
FIG. 3 illustrates the backend process of sharing a user's playlist with other friends/subscribers when they are authorized to watch the same content according to one embodiment.

FIG. 3 illustrates the backend process 300 of sharing a user's playlist with other friends/subscribers when they are authorized to watch the same content according to one embodiment. Once a user creates a playlist, it is stored on the server in the back end infrastructure 310 which enables a user to directly link an individual with a playlist. Each playlist is uniquely identified by the household account number and a user name. For example, User1 has multiple friends and their email addresses (email addresses could be just the service provider email addresses, or email addresses that is associated with their account). User1 shares his playlist with friends that are listed in his address book. After the server in the back office 310 is updated with the sharing request, the server application uses household and user credentials 320 to determine if the contacts selected for sharing the playlist are authorized service provider customers. If the friends are identified as authorized customers, then the server will contact the billing server 330 to check whether the user is entitled to watch the titles on the playlist and if these titles are available to the user 340 (check assets entitlements and attach the entitlement of the assets on the playlist to the other subscribers, linking the same asset to different subscribers if authorized to watch the same content). Available assets are displayed, and not authorized or unavailable assets are grayed-out 340. The shared playlist is then downloaded to the playlist server 310 under the new users' accounts (mechanism to download the playlist from other locations that is created by a user). The next time these users access their playlists folder, they will find the playlist with the assets associated with it 350. If the friends do not have a service, therefore not identified, the list is sent via email 360 with the programs' titles only.

Figure 4:
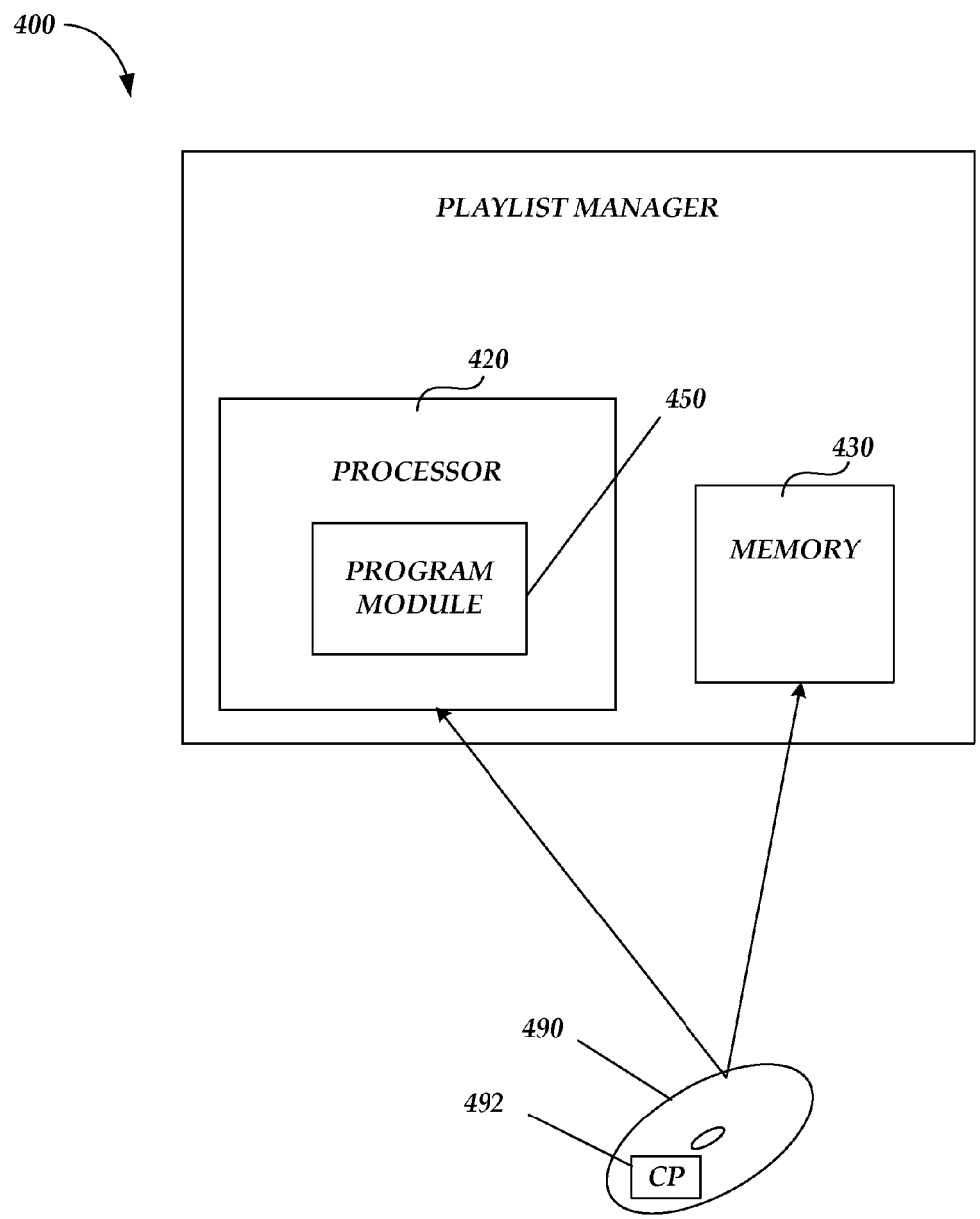
FIG. 4 illustrates a suitable computing environment for implementing a playlist manager for providing for sharing of playlists as described above in FIGS. 1-3 according to an embodiment.

FIG. 4 illustrates a suitable computing environment 400 for implementing a playlist manager for providing for sharing of playlists as described above in FIGS. 1-3 according to an embodiment. In FIG. 4, a playlist manager 400 includes a processor 420 and memory 430. Those skilled in the art will recognize that the playlist manager 400 may be implemented in a head end module, a session resource manager, and other data/content control devices. Further, the playlist manager 400 may be implemented in a distributed computing environment. For example, some functions of the playlist manager 400 may be implemented in the backend and some functions implemented in the set-top box. Embodiments may also be implemented in combination with other types of computer systems and program modules. Generally, program modules include routines, programs, components, data structures, and other types of structures that perform particular tasks or implement particular abstract data types. By way of example, computer readable media 490 can include computer storage media or other tangible media. Computer storage media 490 includes volatile and nonvolatile, removable and non-removable media implemented in any method or technology for storage of information 492, such as computer readable instructions, data structures, program modules or other data. Moreover, those skilled in the art will appreciate that the invention may be practiced with other computer system configurations, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 490 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules 450 and data files may be stored and arranged for controlling the operation of processing devices. Thus, one or more processing devices 420 may be configured to execute instructions that perform the operations of embodiments of the present invention.

It should also be appreciated that various embodiments of the present invention can be implemented (1) as a sequence of computer implemented acts or program modules 450 running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 430 thus may store the computer-executable instructions that, when executed by processor 420, cause the processor 420 to implement a playlist manager 400 according to an embodiment of the invention as described above with reference to FIGS. 1-3.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for sharing, by a user, playlists of authorized content with contacts of the user, comprising:
displaying a user interface on a media viewing device for creating a playlist of content items by a first user;
generating the playlist of content items provided by a service provider, wherein the content items comprising the playlist are selected via the user interface displayed on the media viewing device;
receiving a name for the playlist of content items from the first user;
associating the name with the playlist;
storing the playlist using the name associated with the playlist, a first household account number associated with a household of the first user, and a username associated with the first user within the household;
configuring parameters for sharing the playlist with a second user who is a contact of the first user, including determining whether the second user is subscribed to the service provider and determining a second household account number associated with the second user;
when it is determined that the second user is subscribed to the service provider:
associating the second household account number with the playlist to enable the second user to access the playlist shared by the first user; and
determining, based on the second household account number, whether the second user is authorized, by the service provider, to access each of the content items in the playlist:
when it is determined that the second user is authorized, by the service provider, to access each of the content items, the playlist is configured to provide a link to each of the content items by which each content item is viewable from the service provider by the second user; and
when it is determined that the second user is not authorized, by the service provider, to access each of the content items, the playlist is configured to provide a title of a content item without the link to view the content item for content items that the second user is not authorized to access, wherein the title conveys that the content item is unavailable to the second user from the service provider;
when it is determined that the second user is not subscribed to the service provider, the playlist is configured to provide titles of the content items but not including links to the content items by which the content items is viewable from the service provider; and
transmitting the playlist as an email to the second user who is not subscribed to the service provider.

2. The method of claim 1, wherein the generating the playlist of content items further includes identifying content items the first user has purchased, subscribed to or that is freely accessible.

3. The method of claim 1, wherein the generating the playlist of content items further includes creating the playlist using one selected from a group consisting of:
a set top box;
a web portal;
a smart device; and
a personal computer.

4. The method of claim 1 further comprising modifying the playlist by adding and removing content items from the playlist and saving the modified playlist.

5. The method of claim 1, wherein the storing the playlist comprises storing the playlist on a server in a backend system.

6. The method of claim 5, wherein the configuring parameters for sharing the playlist with contacts of the first user comprises directly linking contacts to the playlist stored on the server in the backend system.

7. The method of claim 1, wherein the configuring parameters for sharing the playlist with contacts of the first user comprises selecting sharing criteria based on a contact list having contact information for the contacts.

8. The method of claim 1 further comprising synchronizing the playlist among access platforms of the first user.

9. The method of claim 8, wherein the synchronizing the playlist among access platforms of the first user further comprises sharing the playlist with other members of the household via the access platforms.

10. The method of claim 1, wherein displaying the user interface on the media viewing device further comprises displaying the user interface via a program guide.

11. The method of claim 1, wherein displaying the user interface on the media viewing device further comprises displaying the user interface via a program running on a mobile device.

12. The method of claim 11, wherein displaying the user interface via the program running on the mobile device further comprises accessing the playlist through a portal displayed by the user interface provided by the program running on the mobile device.

13. The method of claim 1, wherein determining whether the second user is associated with the second household account number further comprises:
   receiving, from the first user, an email address associated with the second user;
   determining whether the email address is associated by the service provider with the second household account number;
   when it is determined that the email address is associated by the service provider with the second household account number, it is determined that the second user is associated with the second household account number; and
   when it is determined that the email address is not associated with the second household account number, it is determined that the second user is not associated with the second household account number and the email address is used in transmitting the playlist as the email to the second user who is not subscribed to the service provider.

14. The method of claim 1, wherein determining based on the second household account number whether the second user is authorized to access the content item further comprises:
   determining a second username associated with the second user in a second household associated with the second household account number; and
   determining whether parental controls affect whether the second user is authorized to access the content item.

15. A method for accessing content in a playlist by a first user associated with the playlist, comprising:
   receiving, at a viewing device of the first user, a notification of a shared playlist created by a second user, the shared playlist has been associated with a household credential and a user credential of the first user, the first user being a contact of the second user;
   accessing, from a playlist server provided by a service provider by the viewing device, a playlist folder associated with the household credential and the user credential for the first user, the playlist folder including the shared playlist;
   determining, by the service provider based on the household credential and the user credential, whether the first user has privileges to access the content identified in the shared playlist created by the second user, wherein:
      when the first user is not authorized to access content provided by the service provider, the playlist including a title of the content but not including a link to the content in the playlist, and
      when the first user is authorized to access content provided by the service provider, the playlist including the title and, when the content is available, including the link to view the content in the playlist from the service provider; and
   taking action, by the first user, regarding content identified in the shared playlist created by the second user based on the privileges of the first user.

16. The method of claim 15, wherein the taking action comprises accessing content in the playlist created by the second user when the privileges of the first user indicate the first user is able to access content in the playlist created by the second user.

17. The method of claim 16, wherein determining privileges of the first user comprises determining the first user is a subscriber to content in the playlist created by the second user.

18. The method of claim 15 further comprising acknowledging the receipt of the playlist created by the second user by the first user.

19. The method of claim 15 further comprising selecting content in the playlist created by the second user for addition to a playlist created by the first user.

20. The method of claim 19, further comprising displaying the playlist created by the second user as a separate playlist with the same title that the second user used to create the playlist.

21. The method of claim 15, wherein the taking action by the first user further comprises receiving the playlist, wherein the first user maintains the title of the received playlist created by the second user and tags the received playlist with an identification of the second user that created the playlist.

22. The method of claim 15, wherein the taking action by the first user further comprises receiving the playlist, wherein the first user changes the title of the received playlist.

23. The method of claim 15 further comprising displaying on the viewing device of the first user a subscription interface for subscribing to the content in the playlist created by the second user when the privileges of the first user do not provide accessibility to the content in the playlist created by the second user.

24. The method of claim 15, wherein receiving, at the viewing device of the first user, the notification of the shared playlist created by the second user further comprises receiving a file for viewing the playlist created by the second user remotely when the first user is not within the service area of a network providing access to the content items in the playlist.

25. A non-transitory computer readable medium including executable instructions which, when executed by a processor, provide for sharing, by a user, playlists of authorized content items with contacts of the user, by:
   displaying a user interface on a media viewing device for creating a playlist of content items by a first user;
   generating the playlist of content items provided by a service provider, wherein content items comprising the playlist is selected via the user interface displayed on the media viewing device;
   receiving a name for the playlist of content items from the first user;
   associating the name with the playlist;
   storing the playlist using the name associated with the playlist, a first household account number associated with a household of the first user, and a username associated with the first user within the household;
   configuring parameters for sharing the playlist with a second user who is a contact of the first user, including determining whether the second user is subscribed to the service provider and determining a second household account number associated with the second user;
   when it is determined that the second user is subscribed to the service provider:
      associating the second household account number with the playlist to enable the second user to access the playlist shared by the first user, and determining, based on the second household account number, whether the second user is authorized, by the service provider, to access each of the content items in the playlist:
when it is determined that the second user is authorized, by the service provider, to access each of the content items, the playlist is configured to provide a link to each of the content items by which each content item is viewable from the service provider by the second user; and
when it is determined that the second user is not authorized, by the service provider, to access each of the content items, the playlist is configured to provide a title of a content item without the link to view the content item for content items that the second user is not authorized to access, wherein the title conveys that the content item is unavailable to the second user from the service provider;
when it is determined that the second user is not subscribed to the service provider, the playlist is configured to provide titles of the content items but not including links to the content items by which the content items is viewable from the service provider; and
transmitting the playlist as an email to the second user who is not subscribed to the service provider.

26. A system for sharing playlists of authorized content with contacts of a user creating the playlist, comprising:
memory for storing data; and
a processor, coupled to the memory, the processor:
displaying a user interface on a media viewing device for creating the playlist of content items by a first user,
receiving input from the first user for generating the playlist of content items via the user interface,
receiving input associating a name for the playlist of content items by the first user,
storing the playlist using the name associated with the playlist, a first household account number associated with a household of the first user, and a username associated with the first user within the household,
configuring parameters for sharing the playlist with contacts of the first user, and
receiving a request to share the playlist with a second user in the contacts of the first user,
determining whether the second user is subscribed to the service provider and determining a second household account number associated with the second user:
when it is determined that the second user is subscribed to the service provider:
associating the second household account number with the playlist to enable the second user to access the playlist shared by the first user; and
determining, based on the second household account number, whether the second user is authorized, by the service provider, to access each of the content items in the playlist:
when it is determined that the second user is authorized, by the service provider, to access each of the content items, the playlist is configured to provide a link to each of the content items by which each content item is viewable from the service provider by the second user; and
when it is determined that the second user is not authorized, by the service provider, to access each of the content items, the playlist is configured to provide a title of a content item without the link to view the content item for content items that the second user is not authorized to access, wherein the title conveys that the content item is unavailable to the second user from the service provider; and
when it is determined that the second user is not subscribed to the service provider, the playlist is configured to provide titles of the content items but not including links to the content items by which the content items is viewable from the service provider, and transmitting the playlist as an email to the second user who is not subscribed to the service provider.

27. A system for accessing content in a playlist by a first user associated with the playlist, comprising:
memory for storing data; and
a processor, coupled to the memory, the processor:
receiving, at a viewing device of the first user, a notification of a shared playlist created by a second user, the shared playlist has been associated with a household credential and a user credential of the first user, the first user being a contact of the second user,
accessing, from a playlist server provided by a service provider by the viewing device, a playlist folder associated with the household credential and the user credential for the first user, the playlist folder including the shared playlist,
receiving a determination from the service provider, based on the household credential and the user credential, whether the first user has privileges to access the content identified in the shared playlist created by the second user,
wherein when the first user is not authorized to access content provided by the service provider, the playlist including a title of the content but not including a link to the content in the playlist, but when the first user is authorized to access content provided by the service provider, the playlist including the title and, when the content is available, including the link to view the content in the playlist from the service provider, and
receiving an action, from the first user, regarding content identified in the shared playlist created by the second user based on the privileges of the first user.

* * * * *